(12) United States Patent
Zhao

(10) Patent No.: US 8,628,335 B1
(45) Date of Patent: Jan. 14, 2014

(54) POWER TERMINAL CONNECTOR

(71) Applicant: Tyco Electronics Corporation, Berwyn, PA (US)

(72) Inventor: Weiping Zhao, Superior Township, MI (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/708,202

(22) Filed: Dec. 7, 2012

(51) Int. Cl.
*H01R 11/30* (2006.01)

(52) U.S. Cl.
USPC .......................................................... 439/33

(58) Field of Classification Search
USPC ................... 439/33, 845, 846, 847, 844, 843
See application file for complete search history.

(56) References Cited

U.S. PATENT DOCUMENTS

| | | | |
|---|---|---|---|
| 3,396,364 A * | 8/1968 | Bonhomme | 439/743 |
| 5,033,982 A * | 7/1991 | Lucas | 439/750 |
| 5,886,501 A | 3/1999 | Marks et al. | |
| 6,482,049 B1 * | 11/2002 | Swearingen | 439/843 |
| 6,672,911 B2 * | 1/2004 | Zhao et al. | 439/845 |
| 7,229,327 B2 | 6/2007 | Zhao et al. | |
| 7,294,020 B2 | 11/2007 | Zhao et al. | |
| 7,458,862 B2 | 12/2008 | Zhao et al. | |
| 2006/0270277 A1 | 11/2006 | Zhao et al. | |
| 2006/0270286 A1 | 11/2006 | Zhao et al. | |
| 2007/0232154 A1 | 10/2007 | Zhao et al. | |

* cited by examiner

*Primary Examiner* — Phuong Dinh

(57) ABSTRACT

A power terminal connector includes a flexible conductor and first and second terminals. The terminals have terminal bodies each defining a receptacle and each being welded to a corresponding mounting portion of the flexible conductor to mechanically and electrically connect the terminals to the flexible conductor. The terminals have terminal body defining a receptacle and being welded to a corresponding mounting portion of the cable conductor to mechanically and electrically connect the terminals to the cable conductor. Each terminal has a contact spring received in the receptacle that is electrically connected to the terminal body. The contact spring has spring beams being configured to engage a power terminal plugged into the receptacle. The flexible conductor is configured to electrically interconnect the first and second power terminals. The cable conductor is configured to electrically interconnect the power terminal.

23 Claims, 5 Drawing Sheets

POWER TERMINAL CONNECTOR

BACKGROUND OF THE INVENTION

The subject matter herein relates generally to power terminal connectors for connector systems.

Power terminal connectors are used in different types of connector systems. One application is an automotive application, such as for connectors of a battery of a vehicle. For example, battery module to module connections and battery positive and negative connections may be provided by a connector system. In some applications, spacing around the battery, such as above the battery, in front of the battery, to one side or the other of the battery, may be limited. There may not be room for a power terminal connector to extend into such space, or there may not be room around the battery to get a tool for connecting and un-connecting the power terminal connector to the power terminal of the battery. Additionally, connecting and un-connecting the power terminal connector to the power terminal of the battery may be time consuming or require special, expensive tools.

In some applications, two batteries need to be connected together in series or in parallel and a power terminal connector is needed to connect the power terminal of one battery to the power terminal of another battery. Problems arise in connecting one battery to another battery. For example, the spacing between the batteries may vary from application to application. The position tolerance has a wide range between any adjacent two batteries. Additionally, vibration may cause the batteries to move relative to one another. There is a need for a flexible connection in such applications. Some battery to battery connections use a flexible connection, however the flexible connection is connected using bolt and nut connectors which have over-torque, under-torque, cross-thread and spacing problems. Connecting such flexible connections is labor intensive and time consuming.

Some known connections, such as the electrical terminal of U.S. Pat. No. 7,294,020 to Zhao, may be easily terminated to the terminal of the batteries, however such electrical terminals have problems. The electrical terminal uses a single thickness terminal body. When such electrical connectors are required to carry a high current, such as more than 80 Amps, the thickness of the terminal body must be increased, making the electrical connector too inflexible for the application. The electrical connector is unsuitable for carrying high current.

A need remains for a flexible power terminal connector that may be connected between power terminals in an efficient manner. A need remains for a power terminal connector that does not sacrifice current carrying, robustness, and/or package ability for flexibility, and vice versa.

BRIEF DESCRIPTION OF THE INVENTION

In one embodiment, a power terminal connector is provided including a flexible conductor having a first mounting portion, a second mounting portion and a flexible section between the first and second mounting portions. The power terminal connector includes a first terminal coupled to the first mounting portion. The first terminal has a first terminal body defining a receptacle that is welded to the first mounting portion to mechanically and electrically connect the first terminal to the flexible conductor. The first terminal has a first contact spring received in the receptacle that is electrically connected to the first terminal body. The first contact spring has spring beams being configured to engage a first power terminal plugged into the receptacle of the first terminal body to create a power path between the first power terminal and the first terminal body. The power terminal connector includes a second terminal coupled to the second mounting portion. The second terminal has a second terminal body defining a receptacle that is welded to the second mounting portion to mechanically and electrically connect the second terminal to the flexible conductor. The second terminal has a second contact spring received in the receptacle of the second terminal body that is electrically connected to the second terminal body. The second contact spring has spring beams being configured to engage a second power terminal plugged into the receptacle of the second terminal body to create a power path between the second power terminal and the second terminal body. The flexible conductor is configured to electrically interconnect the first and second power terminals.

In another embodiment, a power terminal connector is provided having a flexible conductor having a flexible section between opposed mounting portions and a terminal coupled to one of the mounting portions. The terminal includes a terminal body having a top wall, a bottom wall and opposite side walls defining a receptacle configured to receive a flat power terminal. The bottom wall is welded to the corresponding mounting portion to mechanically and electrically connect the terminal to the flexible conductor. The terminal body has an open front end open to the receptacle and configured to receive the power terminal therethrough. A contact spring is received in the receptacle and is electrically connected to the terminal body. The contact spring has a first band and a second band and spring beams extending between the first and second bands. The spring beams have at least two contact bumps defining interfaces for the power terminal such that each beam has at least two points of contact with the power terminal. The contact points between adjacent beams may be at different locations such that when inserting the power terminal into the terminal, the adjacent beams will be deflected and reach their peak insertion forces at different times, thus reducing the total insertion force. The bands engage the terminal body to create a power path between the terminal body and the power terminal via the bands and the beams.

In a further embodiment, a power terminal connector is provided having a flexible conductor having a flexible section between opposed mounting portions and a terminal coupled to one of the mounting portions. The teiniinal includes a terminal body having a top wall, a bottom wall and opposite side walls defining a receptacle configured to receive a flat power terminal. The bottom wall is welded to the corresponding mounting portion to mechanically and electrically connect the terminal to the flexible conductor. The terminal body has an open front end open to the receptacle and configured to receive the power terminal therethrough. A contact spring is received in the receptacle and is electrically connected to the terminal body. The contact spring has a first band and a second band and spring beams extending between the first and second bands. The spring beams have at least two contact bumps defining interfaces for the power terminal such that each beam has at least two points of contact with the power terminal. The spring beams have overstress bumps approximately centrally positioned between the first and second beams. The at least one of overstress bumps is configured to engage either the top wall or the bottom wall as the spring beams are deflected outward by the power terminal. The overstress bumps create power paths between the corresponding spring beams and the terminal body. The bands engage the terminal body to create power paths between the contact spring and the terminal body.

DETAILED DESCRIPTION OF THE INVENTION

Figure 1:
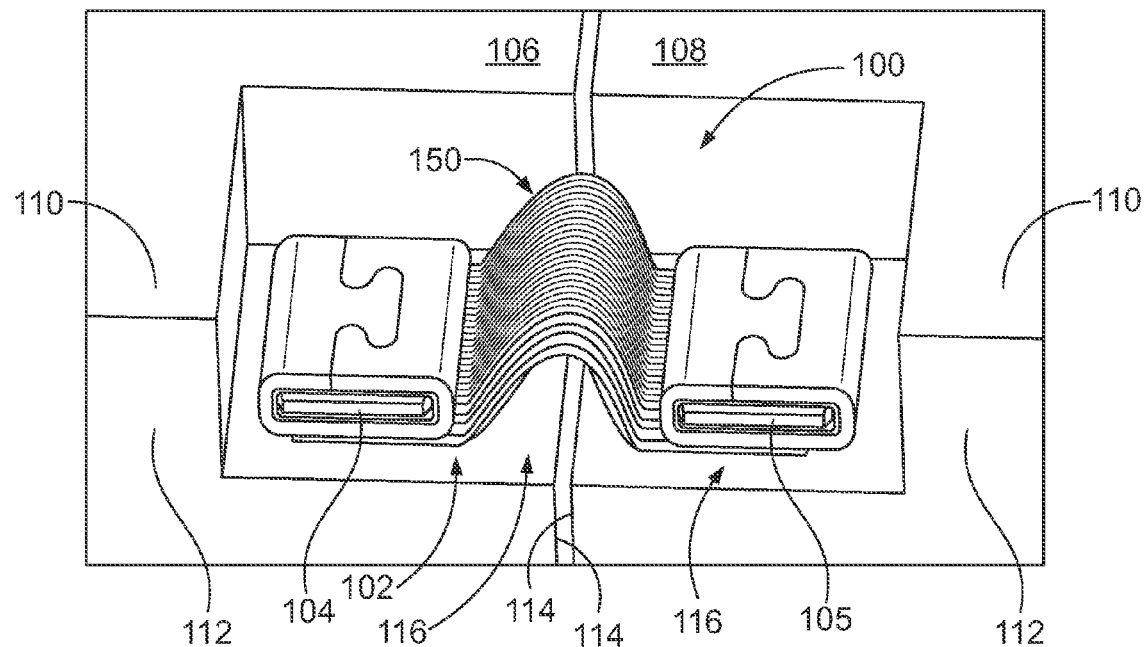
FIG. 1 illustrates a connector system formed in accordance with an exemplary embodiment.

FIG. 1 illustrates a connector system 100 formed in accordance with an exemplary embodiment. The connector system 100 includes a power terminal connector 102 that uses a flexible conductor 150 to electrically connect power terminals 104, 105 (shown in FIG. 2) of components, such as batteries 106, 108. The power terminal connector 102 illustrated in the Figures is illustrative of an exemplary embodiment, but may have other shapes, components or features in alternative embodiments.

The power terminal connector 102 electrically connects the batteries 106, 108. The power terminal connector 102 represents a buss or jumper that interconnects the batteries 106, 108. The batteries 106, 108 may be any voltage battery used in a vehicle. Optionally, the vehicle may be an electric, hybrid-electric vehicle, or any energy storage system and the batteries 106, 108 may be used as part of the power system for the electric vehicle or hybrid electric vehicle or any energy storage systems.

Figure 2:
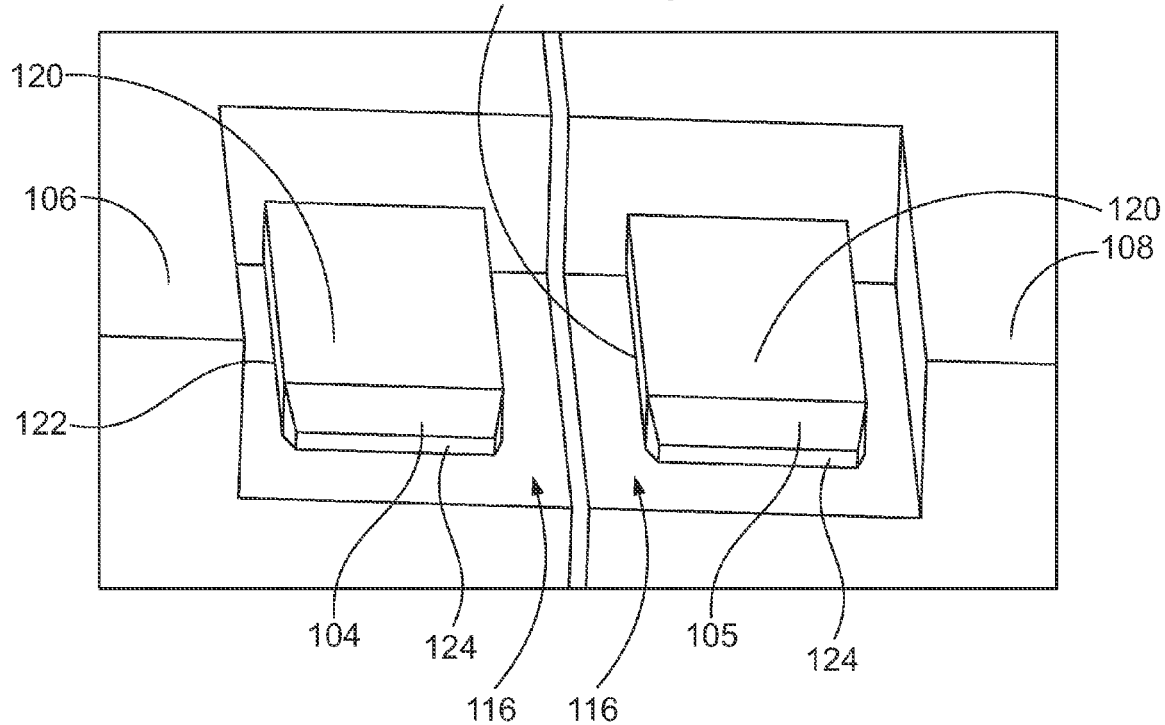
FIG. 2 illustrates a portion of batteries with power terminals extending from the batteries configured to be electrically connected by the connector system shown in FIG. 1.

The power terminal connector 102 is a quick connect/quick disconnect type of connector that may be easily and quickly terminated to the power terminals 104, 105 (shown in FIG. 2). The power terminal connector 102 has a very low profile so as to conserve space around the batteries 106, 108. Other types of power terminal connectors may be used in alternative embodiments that use a flexible conductor to interconnect the batteries 106, 108 or other electrical components.

Each of the batteries 106, 108 includes a top 110, a front 112 perpendicular to the top 110, and a side 114 perpendicular to the top 110 and the front 112. The sides 114 of the batteries 106, 108 face one another. The top 110, front 112 and side 114 generally meet at a corner of the battery 106, 108. In an exemplary embodiment, the battery 106, 108 includes a notched-out area 116 at the corner. The notched-out area 116 is recessed below the top 110, behind the front 112, and inward from the side 114. The notched-out area 116 defines a window or envelope defined by planes extending along the top 110, front 112 and side 114.

The power terminal connector 102 spans across the interface between the sides 114 of the batteries 106, 108 and is positioned in both notched-out areas 116. The power terminals 104, 105 (shown in FIG. 2) are provided at the corresponding notched-out areas 116. The power terminal connector 102 is received in the notched-out areas 116 such that the power terminal connector 102 does not extend beyond (e.g., above) the tops 110 of the batteries 106, 108. The power terminal connector 102 is received in the notched-out areas 116 such that the power terminal connector 102 does not extend beyond (e.g., outward from) the fronts 112 of the batteries 106, 108. As such, other components, such as another battery may be positioned immediately in front of the batteries 106, 108 without interference from the power terminal connector 102. Another component, such as a cover or lid may extend along the tops 110 of the batteries 106, 108 without interference from the power terminal connector 102. In an alternative embodiment, recessing of the power terminal connector 102 may not be necessary, such as when no space constraints are required.

In an exemplary embodiment, the power terminal connector 102 is a flexible connector that allows relative movement between the batteries 106, 108. The power terminal connector 102 spans across the interface between the sides 114 and accommodates different spacing between the batteries 106, 108, movement of the batteries 106, 108, such as from vibration, and the like.

FIG. 2 illustrates a portion of the batteries 106, 108 showing the notched-out areas 116 with the power terminals 104, 105 extending from the batteries 106, 108 at corresponding notched-out areas 116. In an exemplary embodiment, the power terminals 104, 105 are fixed connectors of the batteries 106, 108 providing an interface for the power terminal connector 102 (shown in FIG. 1).

The power terminals 104, 105 extend from, and are electrically coupled to, the batteries 106, 108. In an exemplary embodiment, the power terminals 104, 105 are blade terminals that are generally flat and extend along blade axes (e.g. central, longitudinal axes of the power terminals 104, 105). Other types of power terminals may be used in alternative embodiments. Each of the power terminals 104, 105 includes a top 120, a bottom 122 and a tip 124.

With additional reference to FIG. 1, during assembly, the power terminal connector 102 is loaded into the notched-out areas 116 through the open fronts thereof. When the power terminal connector 102 is connected to the power terminals 104, 105, the terminal power connector 102 electrically connects the power terminals 104, 105. The power terminal connector 102 is a quick connect type connector that may be quickly and easily coupled to the power terminals 104, 105. The power terminal connector 102 may be coupled to the power terminals 104, 105 without the use of any tools. The power terminal connector 102 may be coupled by simply pressing the power terminal connector 102 onto the power terminals 104, 105 in a loading direction without any other actuation, locking or latching required.

Figure 3:
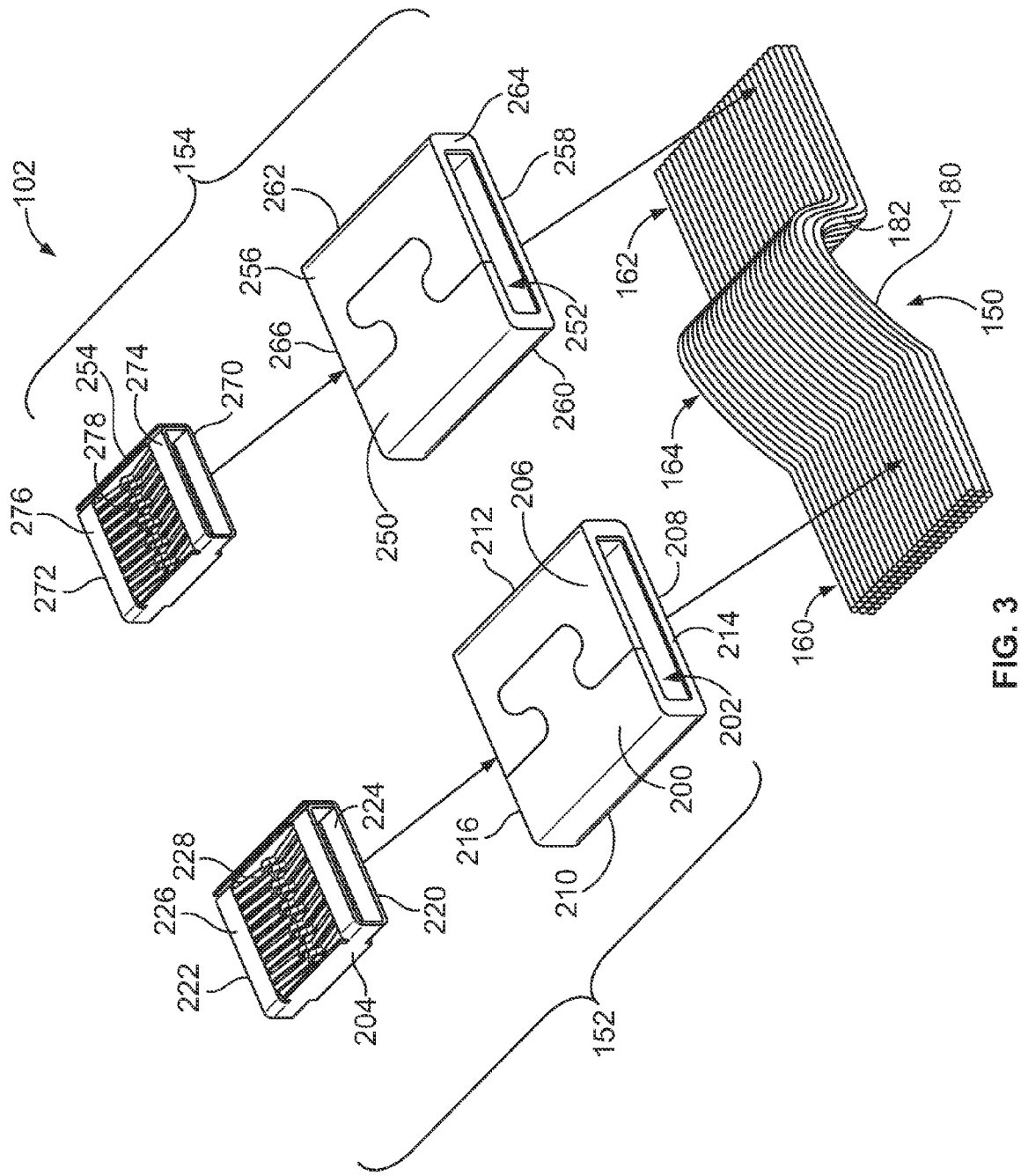
FIG. 3 is an exploded view of a power terminal connector of the connector system.

FIG. 3 is an exploded view of the power terminal connector 102. The power terminal connector 102 includes the flexible conductor 150, a first terminal 152 coupled to the flexible conductor 150 and a second terminal 154 coupled to the flexible conductor 150. The first terminal 152 is configured to be coupled to the first power terminal 104 (shown in FIG. 2). The second terminal 154 is configured to be coupled to the second power terminal 105 (shown in FIG. 2). Optionally, multiple flexible conductors may be used to interconnect the first and second power terminals 104, 105, such as multiple flexible conductors arranged in a stacked configuration and mechanically and electrically connected to the same terminals 152, 154. The first and second terminals 152, 154 are quick connection assemblies that are configured to be releasably coupled to the power terminals 104, 105. Other types of terminal assemblies may be used in alternative embodiments with the flexible conductor 150 to interconnect the power terminals 104, 105.

In an exemplary embodiment, the flexible conductor 150 may be a buss bar used to buss two powered components. The flexible conductor 150 includes a first mounting portion 160, a second mounting portion 162 and a flexible section 164 between the first and second mounting portions 160, 162. The first terminal 152 is coupled to the first mounting portion 160. The second terminal 154 is coupled to the second mounting portion 162. In an exemplary embodiment, the first and second terminals 152, 154 are welded to the mounting portions 160, 162. For example, the terminals 152, 154 may be laser welded, ultrasonically welded or welded by other processes. In other embodiments, the terminals 152, 154 may be mechanically and electrically terminated to the flexible conductor 150 by other means and processes.

In an exemplary embodiment, the first mounting portion 160, second mounting portion 162 and/or flexible section 164 include a plurality of flexible metal (e.g. copper) strands bundled together. Using many small strands allows the conductor to remain more flexible as compared to a single big solid wire. Additionally, the stranded conductor may be scaled up or down by using a conductor having greater or fewer strands to control the current carrying capacity of the buss bar, wherein more strands allows for a higher current carrying capability. In an alternative embodiment, a high flexible stranded cable may be used that includes an insulated jacket surrounding the strand wires, exposed at the ends for termination to the terminals 152, 154. Such stranded cable may be used to protect from inadvertent touching of the wires, such as when the terminals 152 and 154 are far apart. In an alternative embodiment, the flexible conductor 150 may include a flexible, braided wire. In other alternative embodiments, the flexible conductor 150 may have multiple layers of metal sheets in a stacked configuration. For example, the sheet may be folded over multiple times to create a stack-up. The number of folds in the stack-up controls the current carrying ability of the flexible conductor 150, wherein more folds (e.g. a thicker stack-up) allows for a higher current carrying capability. Additionally, the folding allows the use of a thin, flexible sheet to be used but still allow for high current carrying ability. Optionally, the layers may be laminated. It is understood that all exposed conductors will be insulated by cover or housing.

The flexible section 164 is configured to change shape to change the relative position of the first and second mounting portions 160, 162. The flexible section 164 may be lengthened or shortened to variably position the first mounting portion 160 with respect to the second mounting portion 162. The flexible section 164 is shown in a bent state, positioning the first mounting portion 160 closer to the second mounting portion 162 than when the flexible section 164 is relatively flat. In the illustrated embodiment, the flexible section 164 is U-shaped defined by first leg 180 and a second leg 182. The first and second legs 180, 182 are movable with respect to one another to change the angle between the first and second legs 180, 182. Moving the first and second legs 180, 182 varies an axial position of the first mounting portion 160 and the second mounting portion 162. Moving the first and second legs 180, 182 changes the spacing between the first mounting portion 160 and the second mounting portion 162. Optionally, the mounting portions 160, 162 may be movable in three dimensions (e.g. X-Y-Z) with respect to one another and the flexible section 164 accommodates such movement.

The flexible conductor 150 is electrically conductive. In an exemplary embodiment, the flexible conductor 150 is manufactured from copper, however other materials may be used in alternative embodiments. In an exemplary embodiment, the first mounting portion 160, second mounting portion 162 and flexible section 164 are integral and formed from a single piece of copper. Optionally, more than one piece of copper may be used to form the conductor, such as multiple sheets of copper or multiple strands of copper wire. The first mounting portion 160, second mounting portion 162 and flexible section 164 may be a multi-layered structure. The first mounting portion 160 and second mounting portion 162 may have equal or at least one more layer than flexible section 164.

The first terminal 152 includes a first terminal body 200 that is configured to be electrically connected to the flexible conductor 150 and the power terminal 104 (shown in FIG. 2). In an exemplary embodiment, the first terminal body 200 is separately provided from, and coupled to, the flexible conductor 150, such as by welding. In an exemplary embodiment, the first terminal body 200 is box-shaped defining a receptacle 202. The receptacle 202 is sized and shaped to receive the first power terminal 104.

The first terminal 152 includes a first contact spring 204 that is received in the receptacle 202 of the terminal body 200. The contact spring 204 is used to electrically connect the terminal body 200 to the power terminal 104. The contact spring 204 defines a power path between the terminal body 200 and the power terminal 104. The contact spring 204 provides multiple points of contact with the terminal body 200. The contact spring 204 provides multiple points of contact with the power tetininal 104. The contact spring 204 defines a separable mating interface with the power terminal 104 to allow quick connection and quick disconnection.

The terminal body 200 includes a top wall 206, a bottom wall 208 and opposite side walls 210, 212 that define the receptacle 202. The bottom wall 208 is configured to be coupled to the first mounting portion 160, such as by welding the bottom wall 208 to the first mounting portion 160. The terminal body 200 has an open front end 214 open to the receptacle 202. The power terminal 104 is configured to be loaded into the receptacle 202 through the open front end 214. Optionally, the terminal body 200 may include an open rear end 216 opposite the front end 214. The open rear end 216 allows the power terminal 104 to pass entirely through the terminal body 200 without bottoming out against any part of the terminal body 200. In an exemplary embodiment, the terminal body 200 is a stamped and formed body having a stamped workpiece folded into the box-shape with free ends thereof being optionally secured together. Other shapes are possible in alternative embodiments. The terminal body 200 may be oriented at other orientations than the illustrated orientation, such as 90°, 180° or other orientations relative to the flexible conductor 150.

The first contact spring 204 extends between a front end 220 and a rear end 222. The contact spring 204 has a pair of circumferential bands, identified as a first band 224 and a second band 226 at the front and rear ends 220, 222, respectively. The first and second bands 224, 226 are configured to engage the terminal body 200 when the contact spring 204 is loaded into the receptacle 202 to electrically connect the contact spring 204 to the terminal body 200.

A plurality of spring beams 228 extend between the circumferential bands 224, 226 along a top and a bottom of the contact spring 204, thus defining upper spring beams 228 and lower spring beams 228, respectively. In the illustrated embodiment, the spring beams 228 are generally inwardly tapered towards the middle of the contact spring 204. The upper and lower spring beams 228 extend toward each other at the center of the receptacle 202. The shape of the spring beams 228 ensure that the spring beams 228 engage the power terminal 104 when loaded therein. In an exemplary embodiment, the spring beams 228 are deflectable and may be deflected outward when the power terminal 104 is loaded into the contact spring 204. The contact spring 204 defines an electrical path between the power terminal 104 and the terminal body 200.

The second terminal 154 is similar to the first terminal 152, but is coupled to the second mounting portion 162. The second terminal 154 includes a second terminal body 250 that is configured to be electrically connected to the flexible conductor 150 and the power terminal 105 (shown in FIG. 2). In an exemplary embodiment, the second terminal body 250 is separately provided from, and coupled to, the flexible conductor 150, such as by welding. In an exemplary embodiment, the second terminal body 250 is box-shaped defining a receptacle 252. The receptacle 252 is sized and shaped to receive the second power terminal 105.

The second terminal 154 includes a second contact spring 254 that is received in the receptacle 252 of the terminal body 250. The contact spring 254 is used to electrically connect the terminal body 250 to the power terminal 105. The contact spring 254 defines a power path between the terminal body 250 and the power terminal 105. The contact spring 254 provides multiple points of contact with the terminal body 250. The contact spring 254 provides multiple points of contact with the power terminal 105. The contact spring 254 defines a separable mating interface with the power terminal 105 to allow quick connection and quick disconnection.

The terminal body 250 includes a top wall 256, a bottom wall 258 and opposite side walls 260, 262 that define the receptacle 252. The bottom wall 258 is configured to be coupled to the second mounting portion 162, such as by welding the bottom wall 258 to the second mounting portion 162. The terminal body 250 has an open front end 264 open to the receptacle 252. The power terminal 105 is configured to be loaded into the receptacle 252 through the open front end 264. Optionally, the terminal body 250 may include an open rear end 266 opposite the front end 264. The open rear end 266 allows the power terminal 105 to pass entirely through the terminal body 250 without bottoming out against any part of the terminal body 250. In an exemplary embodiment, the terminal body 250 is a stamped and formed body having a stamped workpiece folded into the box-shape with free ends thereof being optionally secured together. Other shapes are possible in alternative embodiments. The terminal body 250 may be oriented at other orientations than the illustrated orientation, such as 90°, 180° or other orientations relative to the flexible conductor 150.

The second contact spring 254 extends between a front end 270 and a rear end 272. The contact spring 254 has a pair of circumferential bands, identified as a first band 274 and a second band 276 at the front and rear ends 270, 272, respectively. The first and second bands 274, 276 are configured to engage the terminal body 250 when the contact spring 254 is loaded into the receptacle 252 to electrically connect the contact spring 254 to the terminal body 250.

A plurality of spring beams 278 extend between the circumferential bands 274, 276 along a top and a bottom of the contact spring 254, thus defining upper spring beams 278 and lower spring beams 278, respectively. In the illustrated embodiment, the spring beams 278 are generally inwardly tapered towards the middle of the contact spring 254. The upper and lower spring beams 278 extend toward each other at the center of the receptacle 252. The shape of the spring beams 278 ensure that the spring beams 278 engage the power terminal 105 when loaded therein. In an exemplary embodiment, the spring beams 278 are deflectable and may be deflected outward when the power terminal 105 is loaded into the contact spring 254. The contact spring 254 defines an electrical path between the power terminal 105 and the terminal body 250.

Figure 4A:
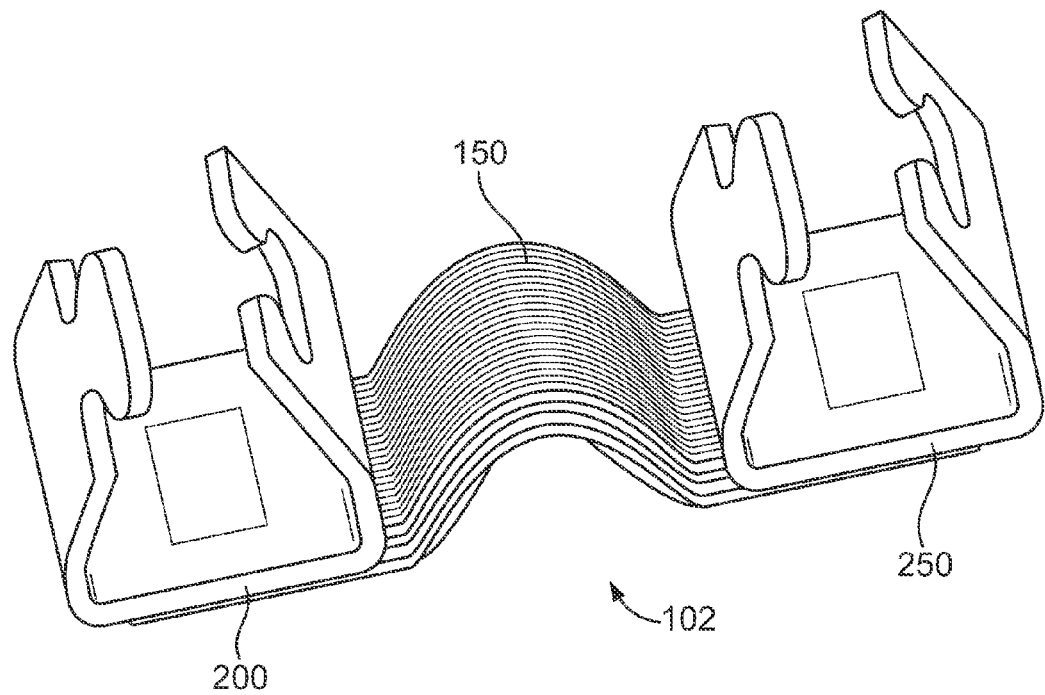
FIG. 4a is a top perspective view of a portion of the power terminal connector.

FIG. 4a is a top perspective view of the power terminal connector 102. The terminal bodies 200, 250 are illustrated terminated to the flexible conductor 150. The terminal bodies 200, 250 are at an opened position prior to loading the contact springs 204, 254 (shown in FIG. 3) into the terminal bodies 200, 250. The flexible conductor 150 is welded to terminal body 200 and 250. Having the tops open allow access to the bottoms of the terminal bodies for the ultrasonic welding or laser welding operation.

Figure 4B:
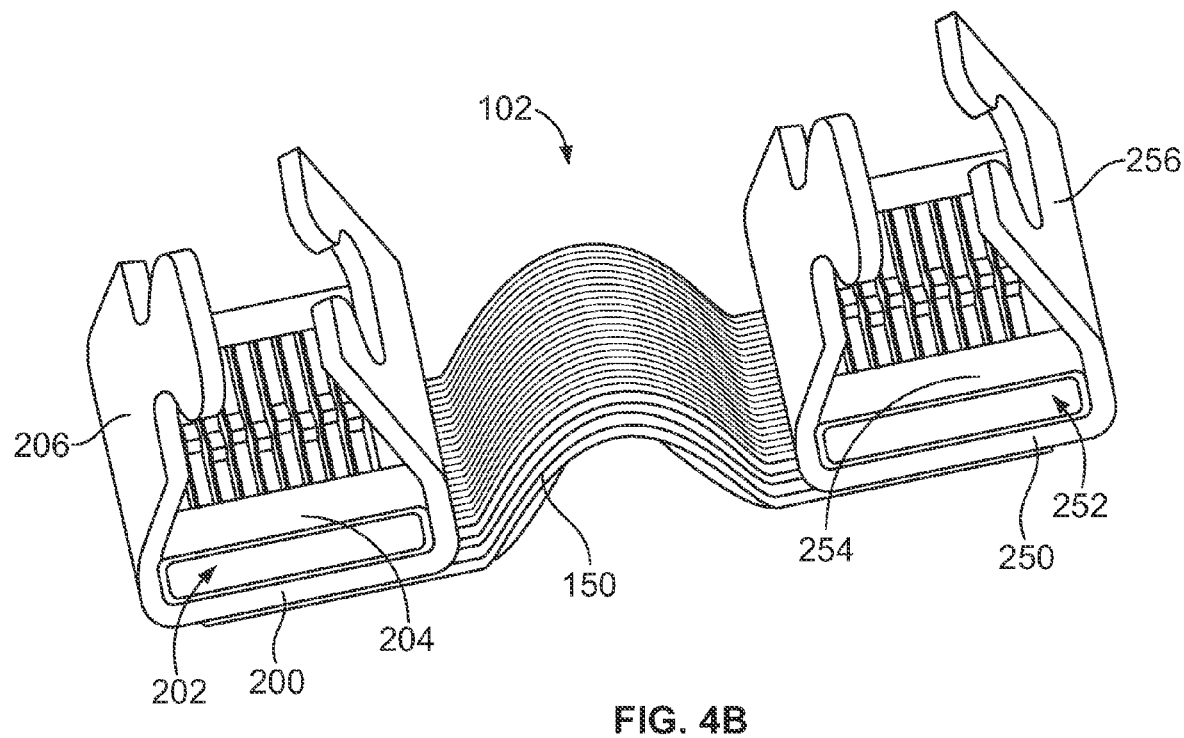
FIG. 4b is a top perspective view of the power terminal connector.

FIG. 4b is a top perspective view of the power terminal connector 102. The terminal bodies 200, 250 are illustrated terminated to the flexible conductor 150. The contact springs 204, 254 are illustrated loaded into the terminal bodies 200, 250. The top walls 206, 256 are shown with sections thereof in an open state prior to being secured together. The contact springs 204, 254 may be loaded into the receptacles 202, 252 through the top prior to securing the sections of the top walls 206, 256 together.

Figure 5:
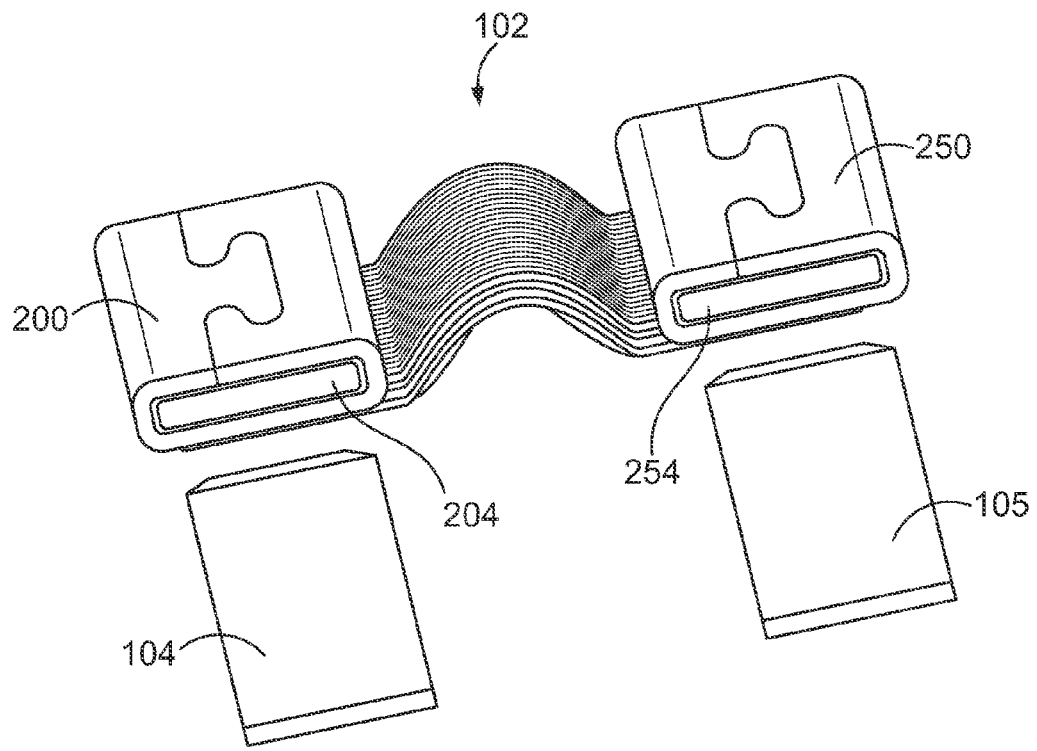
FIG. 5 is a top perspective view of the power terminal connector.

FIG. 5 is a top perspective view of the power terminal connector 102 with the contact springs 204, 254 secured in the terminal bodies 200, 250. The contact springs 204, 254 may be held in the terminal bodies 200, 250 by an interference fit, wherein portions of the contact springs 204, 254 directly engage and are held against portions of the terminal bodies 200, 250. An electrical path is created between the contact springs 204, 254 and the terminal bodies 200, 250 by the engagement therebetween. The power terminal connector 102 is shown poised for coupling to the first and second power terminals 104, 105.

Figure 6:
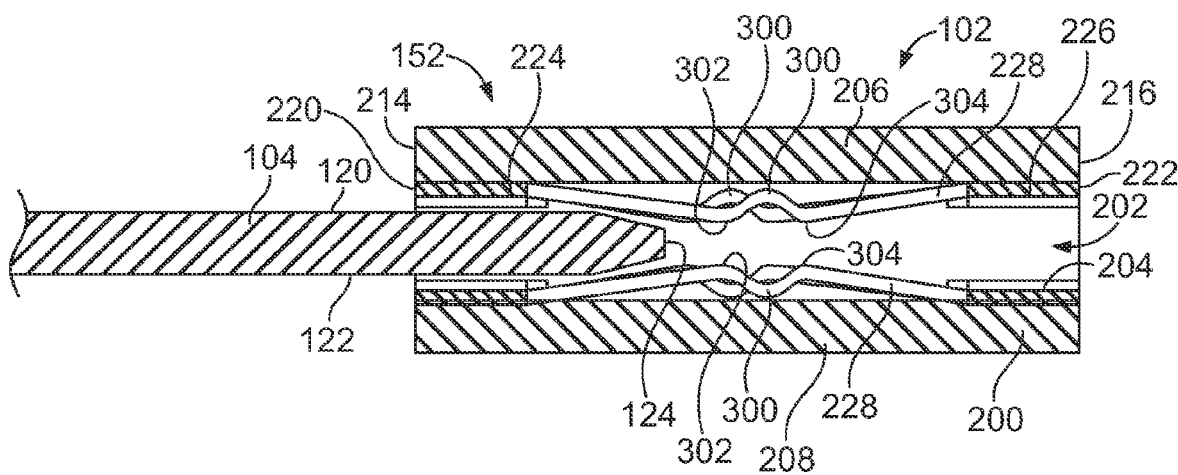
FIG. 6 is a cross sectional view of a portion of the power terminal connector.

FIG. 6 is a cross sectional view of a portion of the power terminal connector 102 showing the first power terminal 104 being loaded into the first terminal 152. The tip 124 of the power terminal 104 is loaded into the receptacle 202 and into the first contact spring 204. The upper and lower spring beams 228 engage the top 120 and bottom 122 of the power terminal 104 to electrically connect the terminal 152 to the power terminal 104.

The contact spring 204 is loaded into the receptacle 202 such that the first and second bands 224, 226 abut against the top and bottom walls 206, 208 (and the side walls 210, 212 shown in FIG. 2). The bands 224, 226 each define at least one point of contact with the terminal body 200 to create an electrical power path between the contact spring 204 and the terminal body 200. In the illustrated embodiment, the points of contact between the contact spring 204 and the terminal body 200 are located proximate to the front end 214 and the rear end 216 of the terminal body 200. For example, the front end 220 of the contact spring 204 may be generally flush with the front end 214 of the terminal body 200 and the rear end 222 of the contact spring 204 may be generally flush with the rear end 216 of the terminal body 200.

In an exemplary embodiment, each of the spring beams 228 may define an additional point of contact with the terminal body 200 to create another electrical power path between the contact spring and the terminal body 200. For example, in an exemplary embodiment, each spring beam 228 includes an overstress bump 300 facing outward toward the terminal body 200. When the power terminal 104 is loaded into the terminal 152, the spring beams 228 are deflected outward. The overstress bumps 300 are forced outward until the overstress bumps 300 engage the terminal body 200. The spring beams 228 are electrically connected to the terminal body 200 via the direct engagement between the overstress bumps 300 and the terminal body 200, such as along the top wall 206 or the bottom wall 208. The overstress bumps 300 limit the amount of deflection of the spring beams 228 preventing overstress and/or plastic deformation of the spring beams 228. When the overstress bumps 300 engage the terminal body 200 further deflection of the spring beams 228 increases the spring force imparted onto the power terminal 104 because the effective beam length of the spring beams 228 is reduced when the overstress bumps 300 engage the terminal body 200.

In an exemplary embodiment, each of the spring beams 228 includes at least two contact bumps 302, 304. The contact bumps 302, 304 define interfaces of the spring beams 228 that are configured to engage the power terminal 104. As such, each spring beam 228 includes multiple points of contact with the power terminal 104 creating a better electrical connection therebetween. The contact bumps 302, 304 are the interior-most portions of the spring beams 228 that are furthest interior from the terminal body 200. The contact bumps 302, 304 are the portions of the spring beams 228 that directly engage the power terminal 104 when the power terminal 104 is loaded into the terminals 152. Optionally, the contact bumps 302, 304 may be defined by the overstress bump 300. For example, the contact bumps 302 304 may be located where the spring beams 228 start to transition or are formed outward to define the overstress bumps 300. The overstress bumps 300 are located between the contact bumps 302, 304.

Optionally, the overstress bumps 300 and corresponding contact bumps 302, 304 may be approximately centered along the spring beams 228 between the first and second bands 224, 226. Optionally, the spring beams 228 may be formed with offset overstress bumps 300 and offset contact bumps 302, 304. For example, adjacent spring beams 228 may have the bumps 300, 302, 304 offset to a forward position or a rearward position (e.g. closer to the front end 220 or closer to the rear end 222, respectively). Such staggering reduces the total insertion force for mating the power terminal connector 102 to the power terminal 104. Optionally, rather than having each alternating spring beam 228 staggered, other patterns of offsetting of the bumps 300, 302, 304 may be utilized, such as having all of the upper spring beams 228 being staggered forward and all of the lower spring beams 228 staggered rearward. Optionally, the bumps 300, 302, 304 may be staggered at more than two different positions.

Figure 7:
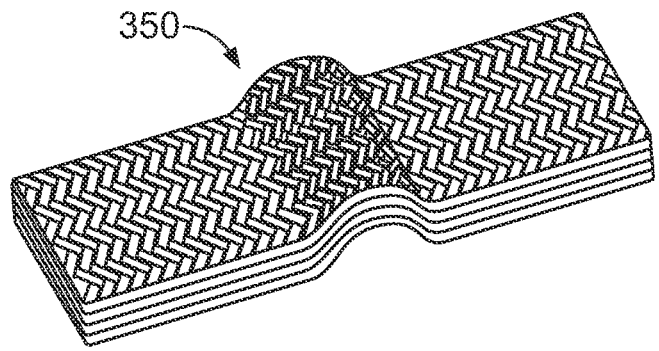
FIG. 7 illustrates a flexible conductor formed in accordance with an exemplary embodiment.

FIG. 7 illustrates a flexible conductor 350 including flexible braided wires. For example, the flexible conductor 350 may include copper braided wires. The weave pattern may affect the flexibility of the structure. The size of the wires may affect the flexibility of the structure.

Figure 8:
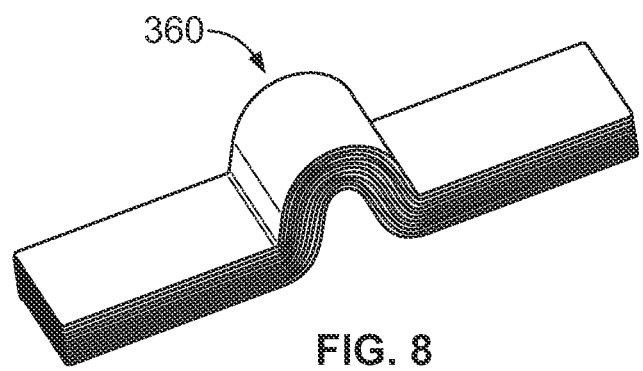
FIG. 8 illustrates a flexible conductor formed in accordance with an exemplary embodiment.

FIG. 8 illustrates a flexible conductor 360 having multiple layers of flexible metal sheets. Optionally, the sheets may be laminated. The sheets may be folded such that the flexible conductor 360 is made from a single sheet formed into multiple layers. Gaps between the layers allow the structure to be flexible. The sheet thickness may affect the flexibility of the structure.

Figure 9:
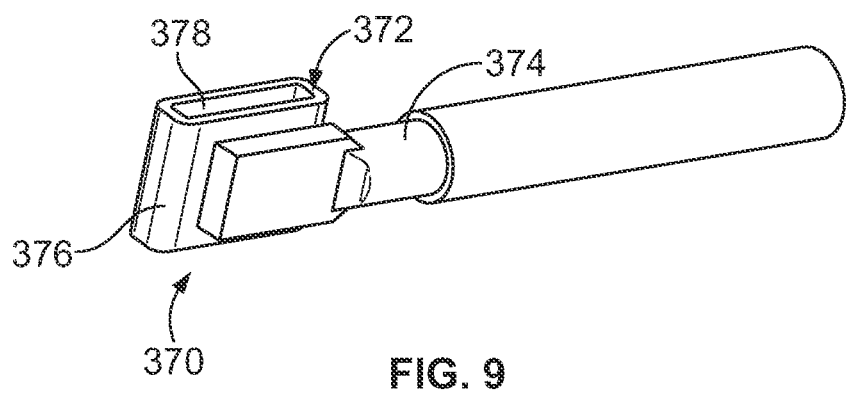
FIG. 9 illustrates a power terminal connector formed in accordance with an exemplary embodiment.

FIG. 9 illustrates a power terminal connector 370 formed in accordance with an exemplary embodiment. The power terminal connector 370 includes a terminal 372 terminated to an end of a flexible conductor 374. In an exemplary embodiment, the flexible conductor 374 is a cable and may be referred to hereinafter as cable 374. The terminal 372 may be welded to the end of the cable 374. Optionally, the cable 374 may be terminated or welded 90° to the illustrated cable orientation, or at another orientation. The terminal 372 may be similar to the terminal 152 (shown in FIG. 2), including a terminal body 376 and a contact spring 378. The power terminal connector 370 may be mated with a corresponding power terminal. Optionally, the opposite end of the cable 374 may have another terminal mounted thereto. Alternatively, the cable 374 may be connected to another component, such as a power source.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A power terminal connector comprising:
    a flexible conductor having a first mounting portion, a second mounting portion and a flexible section between the first and second mounting portions;
    a first terminal coupled to the first mounting portion, the first terminal having a first terminal body defining a receptacle, the first terminal body being welded to the first mounting portion to mechanically and electrically connect the first terminal to the flexible conductor, the first terminal having a first contact spring received in the receptacle and being electrically connected to the first terminal body, the first contact spring having spring beams being configured to engage a first power terminal plugged into the receptacle of the first terminal body to create a power path between the first power terminal and the first terminal body; and
    a second terminal coupled to the second mounting portion, the second terminal having a second terminal body defining a receptacle, the second terminal body of the second terminal being welded to the second mounting portion to mechanically and electrically connect the second terminal to the flexible conductor, the second terminal having a second contact spring received in the receptacle of the second terminal body and being electrically connected to the second terminal body, the second contact spring having spring beams being configured to engage a second power terminal plugged into the receptacle of the second terminal body to create a power path between the second power terminal and the second terminal body;
    wherein the flexible conductor is configured to electrically interconnect the first and second power terminals.

2. The power terminal connector of claim 1, wherein the flexible section allows the first and second mounting portions to move with respect to one another to vary a position of the first mounting portion with respect to the second mounting portion.

3. The power terminal connector of claim 1, wherein the flexible section comprises a flexible braided wire.

4. The power terminal connector of claim 1, wherein the flexible section comprises a plurality of flexible metallic strands bundled together.

5. The power terminal connector of claim 1, wherein the flexible conductor comprises a metal sheet folded over to have multiple layers spanning the flexible section and the first and second mounting portions.

6. The power terminal connector of claim 1, wherein the flexible section is U-shaped having a first leg and a second leg, the first and second legs movable with respect to one another to change an angle between the first and second legs to change the spacing between the first and second mounting portions.

7. The power terminal connector of claim 1, wherein the first and second terminal bodies are box-shaped terminal bodies each having an open front end to receive the corresponding power terminal therethrough.

8. The power terminal connector of claim 1, wherein the first terminal body includes a top wall, a bottom wall and opposite side walls defining the receptacle, the bottom wall being welded to the first mounting portion to mechanically and electrically connect the first terminal to the flexible conductor, the first terminal body having an open front end open to the receptacle and configured to receive the power terminal therethrough.

9. The power terminal connector of claim 1, wherein the first contact spring includes a first band and a second band, the spring beams extending between the first and second bands, each spring beam having at least two contact bumps between the first and second bands defining interfaces for the first power terminal.

10. The power terminal connector of claim 1, wherein the first contact spring includes overstress bumps approximately centrally positioned along each spring beam, the overstress bumps being configured to engage the first terminal body to create a power path between the corresponding spring beam and the terminal body.

11. The power terminal connector of claim 1, wherein the spring beams have contact bumps configured to engage the first power terminal, the contact bumps being staggered relative to a front end of the first terminal.

12. A power terminal connector comprising:
a flexible conductor having a flexible section and a mounting portion at an end of the flexible section;
a terminal coupled to the mounting portion, the terminal comprising:
a terminal body having a top wall, a bottom wall and opposite side walls defining a receptacle configured to receive a flat power terminal, the bottom wall being welded to the corresponding mounting portion to mechanically and electrically connect the terminal to the flexible conductor, the terminal body having an open front end open to the receptacle and configured to receive the power terminal therethrough; and
a contact spring received in the receptacle and being electrically connected to the terminal body, the contact spring having a first band and a second band, the contact spring having spring beams extending between the first and second bands, the spring beams having at least two contact bumps defining interfaces for the power terminal such that each beam has at least two points of contact with the power terminal, the bands engaging the terminal body to create a power path between the terminal body and the power terminal via the bands and the beams.

13. The power terminal connector of claim 12, wherein the spring beams comprise upper spring beams and lower spring beams on opposite sides of the receptacle configured to engage a top and a bottom, respectively, of the power terminal.

14. A power terminal connector of claim 12, wherein the first band entirely circumferentially surrounds the power terminal.

15. The power terminal connector of claim 12, wherein the contact spring includes overstress bumps approximately centrally positioned along each spring beam, the overstress bumps being configured to engage the terminal body to create a power path between the corresponding spring beam and the terminal body.

16. The power terminal connector of claim 12, wherein the interfaces defined by the contact bumps are staggered relative to the front end of the terminal body.

17. The power terminal connector of claim 12, wherein the flexible conductor is a cable.

18. The power terminal connector of claim 12, wherein the flexible conductor is a buss bar having two mounting portions with terminals mounted to both mounting portions.

19. A power terminal connector comprising:
a flexible conductor having a flexible section and a mounting portion at an end of the flexible section;
a terminal coupled to the mounting portion, the terminal comprising:
a terminal body having a top wall, a bottom wall and opposite side walls defining a receptacle configured to receive a flat power terminal, the bottom wall being welded to the corresponding mounting portion to mechanically and electrically connect the terminal to the flexible conductor, the terminal body having an open front end open to the receptacle and configured to receive the power terminal therethrough; and
a contact spring received in the receptacle and being electrically connected to the terminal body, the contact spring having a first band and a second band, the contact spring having spring beams extending between the first and second bands, the spring beams having at least two contact bumps defining interfaces for the power terminal such that each beam has at least two points of contact with the power terminal, the spring beams having overstress bumps approximately centrally positioned between the first and second beams, the overstress bumps being configured to engage either the top wall or the bottom wall as the spring beams are deflected outward by the power terminal, the overstress bumps creating power paths between the corresponding spring beams and the terminal body, the bands engaging the terminal body to create power paths between the contact spring and the terminal body.

20. The power terminal connector of claim 19, wherein the interfaces defined by the contact bumps of adjacent spring beams are staggered relative to the front end of the terminal body.

21. The power terminal connector of claim 19, wherein the overstress bumps of adjacent spring beams are staggered relative to the front end of the terminal body.

22. The power terminal connector of claim 19, wherein the flexible conductor is a cable.

23. The power terminal connector of claim 19, wherein the flexible conductor is a buss bar having two mounting portions with terminals mounted to both mounting portions.

* * * * *